(12) United States Patent
Koistinen

(10) Patent No.: US 7,136,375 B1
(45) Date of Patent: Nov. 14, 2006

(54) METHOD FOR TRANSMITTING CODING INFORMATION OVER PACKET DATA NETWORK

(75) Inventor: Tommi Koistinen, Espoo (FI)

(73) Assignee: Nokia Corporation, Espoo (FI)

( * ) Notice: Subject to any disclaimer, the term of this patent is extended or adjusted under 35 U.S.C. 154(b) by 1087 days.

(21) Appl. No.: 10/030,356

(22) PCT Filed: Jul. 6, 2000

(86) PCT No.: PCT/FI00/00621

§ 371 (c)(1),
(2), (4) Date: Feb. 14, 2002

(87) PCT Pub. No.: WO01/05113

PCT Pub. Date: Jan. 18, 2001

(30) Foreign Application Priority Data

Jul. 9, 1999 (FI) ..................... 991583

(51) Int. Cl.
H04L 12/66 (2006.01)
H04L 12/28 (2006.01)
H04J 3/16 (2006.01)
H04Q 7/20 (2006.01)

(52) U.S. Cl. ............... 370/352; 370/465; 370/401; 455/445

(58) Field of Classification Search ........ 370/352–356, 370/252, 328, 401, 466, 338, 465, 467; 455/445, 455/560
See application file for complete search history.

(56) References Cited

U.S. PATENT DOCUMENTS

| | | | |
|---|---|---|---|
| 5,497,396 A | 3/1996 | Delprat | 375/220 |
| 5,768,308 A | 6/1998 | Pon et al. | 375/219 |
| 6,108,560 A * | 8/2000 | Navaro et al. | 455/517 |
| 6,167,040 A | 12/2000 | Haeggstrom | |
| 6,256,612 B1 * | 7/2001 | Vo et al. | 704/500 |
| 6,292,891 B1 * | 9/2001 | Bergenwall et al. | 713/151 |
| 6,577,637 B1 * | 6/2003 | Sieppi | 370/401 |
| 6,611,694 B1 * | 8/2003 | Oltedal et al. | 455/560 |

(Continued)

FOREIGN PATENT DOCUMENTS

EP  0 996 295 A1  4/2000

(Continued)

OTHER PUBLICATIONS

Office Action dated Feb. 24, 2005 in corresponding Japanese Application No. 2001-510205.

(Continued)

Primary Examiner—Huy D. Vu
Assistant Examiner—Nittaya Juntima
(74) Attorney, Agent, or Firm—Cohen, Pontani, Lieberman & Pavane

(57) ABSTRACT

The invention relates to a method (300, 400, 500) for transmitting information related to tandem free operation, where a cellular network comprising a tandem free operation capable coding-decoding unit is connected to a packet network, an entity, which can be a second network or a terminal, is connected to the packet network and data is transmitted over the packet network between said coding-decoding unit on a first side of the packet network and said entity on a second side of the packet network. The method according to the invention is characterized in that information about the decoding capabilities and tandem free operation capabilities on the first side of the packet network is transmitted (320, 420, 520) over the packet network to the second side of the packet network. The invention relates also to a decoding information exchange arrangement (611), to a gateway (610), to a decoding information transmission arrangement (601) and to a cellular network element (600).

17 Claims, 4 Drawing Sheets

U.S. PATENT DOCUMENTS

| | | | |
|---|---|---|---|
| 6,633,582 B1 * | 10/2003 | Panburana et al. | 370/465 |
| 6,657,996 B1 * | 12/2003 | Mladenovic et al. | 370/356 |
| 6,671,367 B1 * | 12/2003 | Graf et al. | 379/229 |
| 6,832,088 B1 * | 12/2004 | Stumpert | 455/445 |
| 6,856,612 B1 * | 2/2005 | Bjelland et al. | 307/338 |
| 2002/0049860 A1 * | 4/2002 | Koistinen | 709/247 |
| 2002/0054571 A1 * | 5/2002 | Falsafi | 370/252 |

FOREIGN PATENT DOCUMENTS

| | | |
|---|---|---|
| EP | 1 014 738 A2 | 6/2000 |
| JP | 09-191324 | 7/1997 |
| JP | WO 00/70885 | 5/2000 |
| JP | 2000 500907 | 1/2003 |
| WO | WO 99/31911 | 6/1999 |
| WO | WO 00/24210 | 4/2000 |
| WO | WO 00/39970 | 7/2000 |
| WO | WO 00/51330 | 8/2000 |

OTHER PUBLICATIONS

S. Yasuda, K. Uramoto, and A. Murase, "Network Functions for the Application of Multi-rate Speech Coding in Digital Cellular Systems," 1994 IEEE Vehicular Technology Conference.

GSM 08.62 version 7.0.0 Release 1999, "Digital cellular telecommunication system (Phase 2+); Inband Tandem Free Operation (TFO) of Speech Codecs".

T. Hoshi, K. Tanigawa, and Kojhi Tsukada, "Proposal of a Method of for Vlice Steam Multiplexing for IP Telephony System," IEEE Internet Workshop, Feb. 1999.

Office Action dated Jun. 14, 2005 on corresponding Japanese Application No. 2001-510205.

Office Action dated May 9, 2003 in corresponding Chinese Patent Application No. 00810055.1.

* cited by examiner

METHOD FOR TRANSMITTING CODING INFORMATION OVER PACKET DATA NETWORK

PRIORITY CLAIM

This is a national stage of PCT application No. PCT/FI00/00621, filed on Jul. 6, 2000. Priority is claimed on patent application No. 991583 filed in Finland on Jul. 9, 1999.

FIELD OF THE INVENTION

The invention relates in general to avoiding multiple coding and decoding of data in data connections that involve cellular networks. In particular the invention relates to extending tandem free operation to connections that pass over non-conventional telephony networks.

BACKGROUND OF THE INVENTION

In conventional PSTNs (Public Switched Telephony Network) the digitized speech is presented in a format that requires 64 kbps for transmission. In cellular networks efficient speech coding methods are used to compress the digitized speech before sending the speech over the radio access network. Decoding is used to obtain a data flow that is similar to the original digitized speech flow, for example, before transmitting the speech further to PSTN. The coding methods used in cellular networks compress the speech to a data flow that can be transmitted using less than 16 kbps in the fixed part of the cellular network. In the radio access network part of the cellular network also channel coding is needed, and the coded speech is also presented in a different format than in the fixed part of the cellular network.

If both the caller and callee use mobile stations then, in the absence of any precautions, the speech is coded and decoded twice, because it needs to be transmitted over a radio access network twice. This double coding may deteriorate the quality of the speech. It is possible to code the speech only once, if the coded speech is transmitted over the cellular networks and possible PSTN in between the cellular networks. This kind of operation is called tandem free operation (TFO).

FIG. 1 presents an example of the tandem free operation in a GSM (Global System for Mobile Communications) network. A one-way connection is presented in FIG. 1 for the sake of clarity. Usually connections are bidirectional, and the same functionality is performed in both directions. The mobile station MS1 101 communicates over a radio access network with a base station BS1 102. The digitized speech is coded in the mobile station, using coder C as presented in FIG. 1. Between a mobile station and a base station, the coded speech is presented in a format that is typical for the air interface. From the base station onwards, the coded speech is carried to a transcoder and rate adaptation unit (TRAU) in a certain format called TRAU frames. In FIG. 1 the base station BS1 transmits the coded speech to TRAU1 103. Base station controllers are not involved in the speech coding and are, therefore, not presented in FIG. 1.

The transcoder and rate adaptation unit usually decodes the speech and sends it further as a pulsed code modulation (PCM) signal that carries data with the rate of 64 kbps. The speech is sent to a Mobile Services Switching Center (MSC) which relays it either to another MSC or to the public telephony network. In FIG. 1 the TRAU1 decodes the coded speech (decoder D) and transmits the decoded speech to MSC1 104, and from there the speech is relayed via the PSTN 105 to another cellular network. The MSC2 106 relays the decoded speech further to TRAU2 107, where the speech is coded (coder C') and inserted to TRAU frames. The base station BS2 108 converts the TRAU frames into a radio access network format, and transmits the data over the air interface to the mobile station MS2 109. In this mobile station the coded speech is decoded (decoder D').

The different arrows 110, 111 and 112 in FIG. 1 are used to present the data presentation format and signal carrying the data. Dashed arrows 110 refer to coded speech and the air interface. Solid arrows 111 refer to TRAU frames that require either an 8 kbps or a 16 kbps transmission channel and thick arrows 112 refer to decoded speech that requires a 64 kbps transmission channel and PCM signal.

If both mobile stations and TRAUs involved in a call have a common coder-decoder pair, it is possible to encode the speech only once. In the situation presented in FIG. 1, in tandem free operation the speech is coded in MS 1 and decoded in MS2. TRAU1 relays the TRAU frames as TFO TRAU frames within the decoded speech (arrow 113 in FIG. 1). The TRAU1 performs also decoding and the decoded speech is transmitted to TRAU2, but it is used only if TRAU2 cannot extract the TFO TRAU frames from the data it receives. If TRAU2 notices the TFO TRAU frames, it relays the decoded speech carried by the TFO TRAU frames to BS2 in TRAU frames.

Tandem free operation requires thus special functionality, i.e. TFO capability, from the TRAUs. In practice the TFO capability means the following three things. First, the TRAUs can negotiate which coder is used. Second, they can transmit TFO TRAU frames to each other as part of the PCM signal and third, they can extract the TFO TRAU frames from the incoming PCM signal. In GSM the TFO TRAU frames are carried over the PCM so that the one or two least significant bits in each 8 bit long speech sample are replaced by TFO TRAU frame information. The TFO TRAU frame information is carried thus in a 8 kbps or 16 kbps subflow of the 64 kbps PCM flow. The destination TRAU can then ignore the rest of the PCM signal, and relay the TFO TRAU frames as TRAU frames towards the destination mobile station.

The transcoder and rate adaptation units involved in a call negotiate the speech coder using TFO inband signaling. This signaling is performed by modifying certain bits of the TRAU frame structure. The data carried in TRAU frames and TFO TRAU frames is essentially the same except for the TFO signaling bits. In the beginning of a call the TRAU units may each select the coder they use, but if both TRAUs support tandem free operation, a common coder may be negotiated. The decoded speech is usually also transmitted in the PCM signal even after a common coder has been agreed on. This is because after a handover, for example, both TRAUs involved in the call may not support the tandem free operation.

In the following term TFO frame is used to refer to frames that carry coded data, information about the coder and tandem free operation capability of a coding-decoding unit. These TFO frames are exchanged between coding-decoding units of cellular networks.

The current tandem free operation works between two cellular networks or if the cellular networks are connected via a PSTN. In the recent years, however, there has been an explosive growth in real-time data applications that use packet networks like the Internet as transport medium. These real-time applications can support voice calls and video calls. It is possible to use the Internet or other packet networks as transmission media between cellular networks, instead of PSTN. Especially with the third generation networks that are at least partly packet based, the use of packet networks between the cellular networks is a natural choice.

The H.323 specification has been created by the International Telecommunications Union (ITU) for the purpose of defining a standard framework for audio, video and data communications over networks that do not provide a guaranteed quality of service (QoS). Packet networks, for example, may be such networks. The aim of the H.323 specification is to allow multimedia products and applications from different manufacturers to interoperate.

FIG. 2 presents a situation where two GSM networks are connected with an IP (Internet Protocol) network. Each of the GSM networks 201, 202 is connected to the IP network 203 with an Voice over IP (VoIP) gateway. These VoIP gateways 204, 205 are connected to the MSCs 104, 106. From the cellular network they receive 64 kbps decoded speech as PCM signal (arrows 112 in FIG. 2), and they compress this data flow. The compressed data flow is then transferred over the IP network to another VoIP gateway (arrows 210 in FIG. 2). Usually the compressed data flow requires either 8 kbps or 16 kbps of transmission capacity. The H.323 specification, for example, defines certain codecs that can be used for compressing data in H.323 networks. It is also possible to construct proprietary coders and gateways. Term gateway refers here neither to any specific packet network technology nor to any specific standards on telephony over packet networks. It is used as a general term for a network element connecting a cellular network and a packet network and relaying calls and other connections to and from the cellular network.

Here terms code and decode refer to methods that are used in cellular networks.

Terms compress and decompress refer to methods that are used on the edge of packet networks.

The problem in using compression in gateways when transmitting calls between cellular networks is that in the worst case the speech (or other data) is coded and decoded three times. First in the originating cellular network, then when transmitted between the cellular networks and finally in the destination cellular network. This may reduce the quality of the speech drastically.

A further problem is that even in a case, where both coding-decoding units involved in a call are TFO capable, it is possible that this feature cannot be utilized. This is because the TFO frames, which carry information about the data coders and TFO capabilities of the coding-decoding units and which are possible included in the PCM signal, do not necessarily stay unmodified in the compression and decompression in the gateways. Especially the TFO signaling, which is carried in certain bits of the TFO frame, is sensitive to change due to compression.

It is possible to extend the tandem free operation to situation, where a call is transmitted over a packet network, for example by relaying the TFO frames over the packet network. In principle, this relaying ensures that all necessary information, for example coded data, indication of the coding method and of the tandem free operation capability, is transmitted over the packet network. On the other side of the network, the TFO frames can be relayed further or the coded data can be decoded and transmitted further. Gateway that can relay TFO frames (or otherwise relay information corresponding to the frames) between a packet network and another network are here called tandem free operation capable gateways.

There are problems in extending tandem free operation by straightforwardly relaying the TFO frames or otherwise transmitting the information carried in the frames. The second gateway on the other edge of the packet network may be connected, for example, to a PSTN or to a cellular network that does not support tandem free operation. The second gateway should, in this case, decode the coded data it receives in the TFO frames, but a suitable decoder is not necessarily supported in the gateway.

Even in a case, where a packet network connects two TFO capable coding-decoding units, relaying the TFO frames may not work. In the beginning of a call each pair consisting of a coding-decoding unit and a mobile station selects the coder independently of the other pair. The current tandem free operation does not support the option that a coding unit receives TFO frames, where data is coded with one coder, and before sending, for example, TRAU frames further, it decodes the coded data and re-codes it using a different coder. Therefore, when the TFO frames are relayed over the packet network and the coders used in the cellular networks are different, the downlink gateway must decode the coded data flow. Again, a suitable decoder is not necessarily supported in the gateway.

In both these cases the uplink gateway should compress the complete data flow that is carried by, for example, the PCM signal. The downlink gateway could then decompress the data flow it receives and transmit the decompressed data further. But as discussed above, it is not advisable to perform this compression-decompression, if the TFO frames can be relayed over the packet network.

SUMMARY OF THE INVENTION

The object of the invention is to present a method for enabling a versatile selection of the way in which data is transmitted over a packet network. Especially, the object is to extend the tandem free operation over a packet network by transmitting data using frames that carry coded data as often as possible.

The object of the invention is achieved by exchanging over the packet network information about decoders and tandem free operation capabilities supported on each side of the packet network.

A method according to the invention is a method for transmitting information related to tandem free operation, where a cellular network comprising a tandem free operation capable coding-decoding unit is connected to a packet network, an entity, which can be a second network or a terminal, is connected to the packet network and data is transmitted over the packet network between said coding-decoding unit on a first side of the packet network and said entity on a second side of the packet network, and it is is characterized in that information about the decoding capabilities and tandem free operation capabilities on the first side of the packet network is transmitted from a first gateway, which connects the cellular network to the packet network, over the packet network to the second side of the packet network to a second gateway, which connects said entity to the packet network, for enabling on said second side of the packet network transmission of data frames to the packet network, when such data frames are either received from said entity or producible using at least information received from said entity, said data frames carrying coded data and signaling information relating to tandem free operation, and the coding of the coded data in the data frames corresponding to the decoding capabilities on the first side.

A decoding information exchange arrangement according to the invention is an arrangement for exchanging information over a packet network, which comprises
  means for establishing tandem free operation information about the tandem free operation capability on its side of the packet network and
  means for communicating data structures over the packet network, and it is characterized in that it comprises
  means for establishing decoding information about decoders on its side of the packet network,
  means for establishing a data structure that comprises said tandem free operation information and at least a certain part of said decoding information and
  means for receiving information about tandem free operation capability and decoding information on another side of the network for enabling to the packet network transmission of data frames, when such data frames are either received from its side of the packet network or producible using at least information received from its side of the packet network, said data frames cog coded data and signaling information relating to tandem free operation, and the coding of the coded data in the data frames corresponding to the decoding capabilities on said another side.

A gateway according to the invention is a gateway for connecting a first network to a certain side of a second network, which second network is a packet network, which gateway comprises
  means for establishing tandem free operation information about the tandem free operation capability on said side of the packet network and
  means for communicating data structures over the packet network, and it is characterized in that it comprises
  means for establishing decoding information about decoders on said side of the packet network,
  means for establishing a data structure that comprises said tandem free operation information and at least a certain part of said decoding information and
  means for receiving information about tandem free operation capability and decoding information on another side of the network for enabling to the packet network transmission of data frames, when such data frames are either received from its side of the packet network or producible using at least information received from its side of the packet network, said data frames carrying coded data and signaling information relating to tandem free operation, and the coding of the coded data in the data frames corresponding to the decoding capabilities on said another side.

A decoding information transmission arrangement according to the invention is characterized in that
  it comprises means for establishing decoding information about decoders in a cellular network and
  said means for establishing decoding information comprise means for transmitting at least a certain part of said decoding information outside the cellular network A cellular network element according to the invention is characterized in that
  it comprises means for establishing decoding information about decoders in a cellular network and
  said means for establishing decoding information comprise means for transmitting at least a certain part of said decoding information outside the cellular network.

In the method according to the invention, it is assumed that at least one tandem free capable coding-decoding unit of a cellular network is involved in the connection. The uplink data coming from this cellular network comprises decoded data and TFO frames, which carry coded data, details about the used coder and signaling related to the tandem free operation. In GSM network, for example, these frames are the TFO TRAU frames. If a connection does not involve any TFO capable coding-decoding unit, there is no need to figure out whether to transmit TFO frames over a packet network.

In the method according to the invention, data is transmitted between the TFO coding-decoding unit of a first cellular network and another network over a packet network. The networks may be connected to each other, for example, by gateways.

The gateways may be able to relay the TFO frames, and some coders and decoders may be implemented in the gateways. The TFO frames relay and coding and decoding functionality may be provided on the edges of the packet network also in some other manner than in gateways.

In the method according to the invention, information about the decoding functionality that is supported on a first side of the packet network is transmitted to the other side of the network. The decoding functionality may be implemented either in a cellular network (or other network that is connected to the packet network) or, for example, in the gateway that connects the cellular network to the packet network. Information about the TFO frame relay capability on the first side of the packet network is also transmitted. Based on this information, an entity, for example a gateway, on the other side of the packet network may decide, how to transmit data over the packet network.

The fundamental advantage of the method according to the invention is that the exchange of TFO capabilities and decoding features allows to choose the transmission method so that it minimizes the number of coding-decoding pairs that are used in a connection. This prevents unnecessary deterioration of the quality of the transmitted data. It may also save some processing power in the network elements, for example in the coding-decoding units and in the gateways. These elements may only relay coded data instead of decoding the data. The exchange of TFO capabilities and decoding features also makes it possible to load necessary coders or decoders to a gateway before it receives from the packet network data that needs to be processed using the coders or decoders.

The capability information that is transmitted in the method according to the invention enables the gateways, for example, to select how they transmit data over the packet network. The gateway that connects a cellular network to the packet network may, for example, relay the TFO frames as such. Another option is that it decodes the data it receives, re-codes it using another coder and transmits the re-coded data in TFO frames. It may also compress the whole data flow it receives and transmit the compressed data.

Similarly, the gateway that connects the other network to the packet network has also many options. If the gateway, for example, receives uncoded data, it may code the data using a coder corresponding to the decoder that is employed, for example, in the endpoint of a connection. This way the data that is transmitted over the packet network and the cellular network is coded only once.

One advantage of the method according to the invention is that it works without modifying current cellular networks. The gateways, for example, on the edge of the packet network can establish the necessary information about decoding features by monitoring the TFO frames. This monitoring provides information about the decoding method that is employed in the present connection in the cellular network.

Further advantages can be achieved, if a cellular network can transmit information about the coding and decoding methods that is supports. For example, a coding-decoding unit may accept TFO frames where one coder has been applied, decode the received coded data and then code the data using another coder. In this case, TFO frames where one coder has been applied can be decided to be relayed over the packet network and further to the cellular network. There the coding-decoding unit modifies the data before sending it to the endpoint of the connection.

Further, if the cellular networks and gateways transmit information about the coding and decoding features and the TFO capability of the gateways, the coder or coders (if different coders are used in the opposite directions, for example) may be negotiated already when a call is being established. This way the tandem free operation may be turned on from the beginning of a call. Currently the tandem free operation is negotiated between the coding-decoding units only after a certain coder has already been selected separately by each coding-decoding unit and the mobile station that communicates with it.

Further advantages of the invention are discussed in connection with the preferred embodiments of the invention.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

The invention will now be described more in detail with reference to the preferred embodiments by the way of example and to the accompanying drawings where.

Above in conjunction with the description of the prior art reference was made to FIGS. 1 and 2. The same reference numerals are used for corresponding parts in the figures.

DETAILED DESCRIPTION OF THE PRESENTLY PREFERRED EMBODIMENTS.

Figure 1:
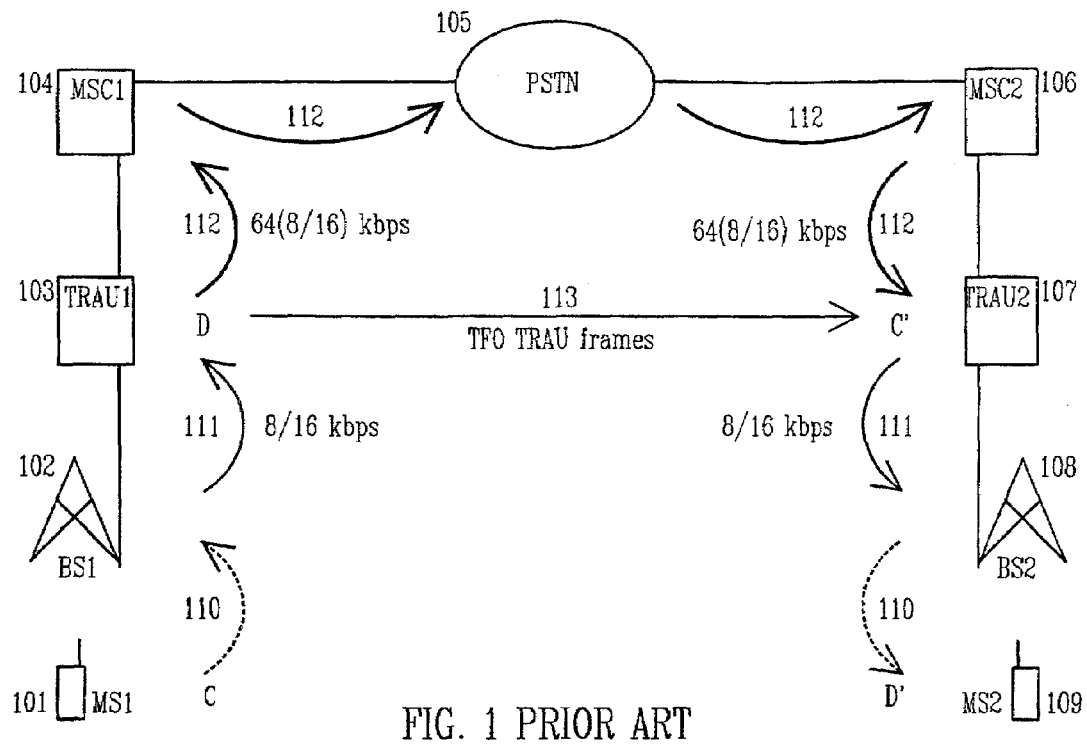
FIG. 1 shows a schematic drawing of a call between two mobile stations.
Figure 2:
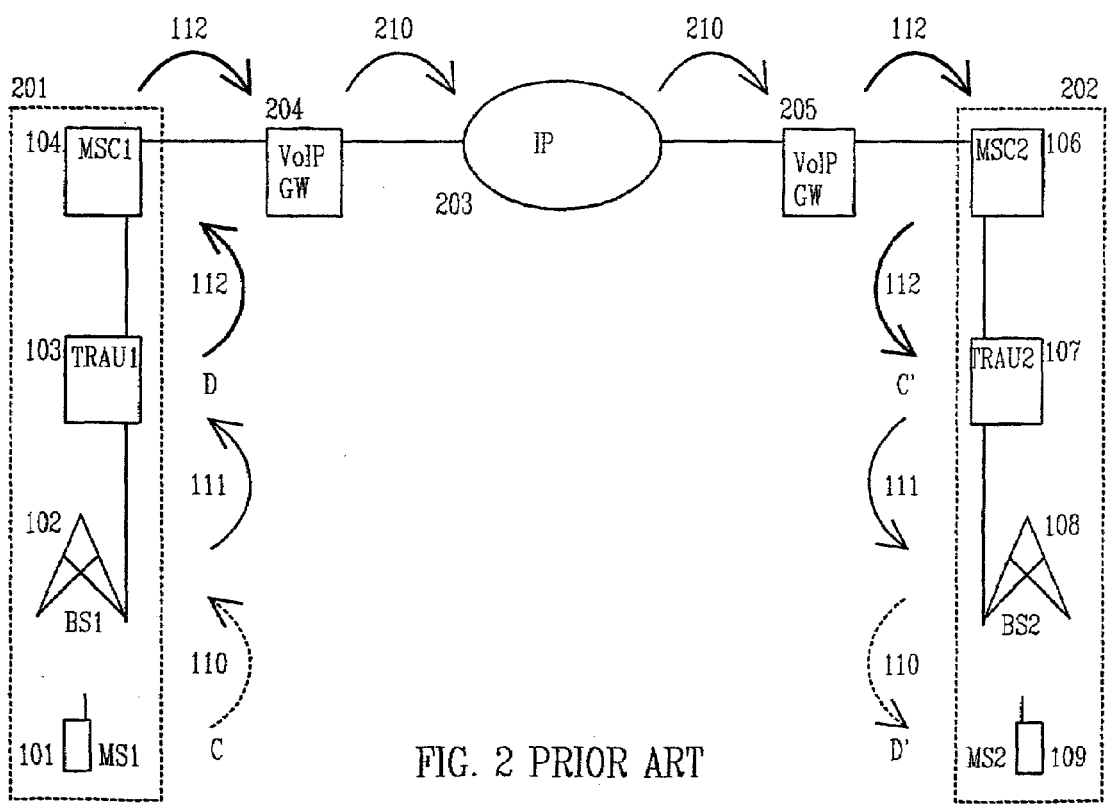
FIG. 2 shows a schematic drawing of a call between two mobile station that is passing a packet network.
Figure 3:
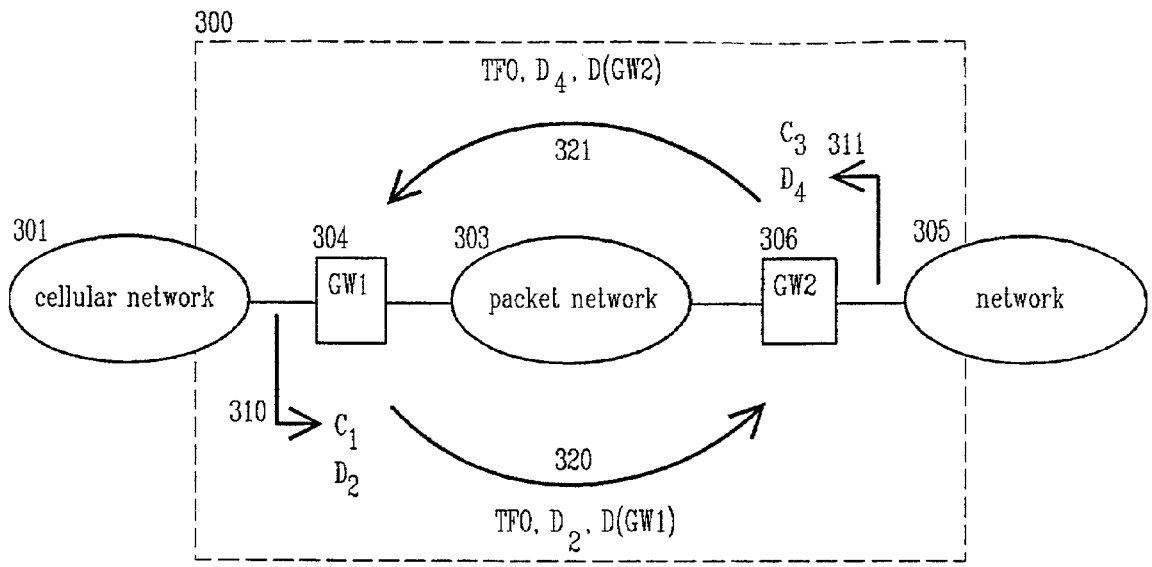
FIG. 3 shows a schematic drawing of a method according to a first preferred embodiment of the invention where information about decoding is inferred from TFO frames.

FIG. 3 presents a method 300 according to a first preferred embodiment of the invention where information about the decoding capabilities and TFO capabilities on a first side of the packet network is transmitted to the other side of the packet network. One of the networks connected to the packet network is a cellular network. Data about decoding capabilities of the cellular network is established by monitoring the TFO frames. This method is applicable to, for example, the GSM network and TFO TRAU frames.

The cellular network 301, where a tandem free operation capable coding-decoding unit 302 is involved in the connection, is connected to the packet network 303. A gateway GW1 304 may be used to connect the cellular network 301 to the packet network 303. On the other side of the packet network there is another network 305, which is connected to the packet network, for example, with the gateway GW2 306.

On the edges of the packet network, for example in the gateways, certain coders and decoders may be implemented. The set of coders implemented in the first gateway 304 is marked by C(GW1) and the set of decoder by D(GW2). Similarly, C(GW2) and D(GW2) refer to the coders and decoders implemented in the second gateway 306.

When a connection has been established between, for example, a mobile terminal in the cellular network 301 and another endpoint in the second network 305, data begins to flow in both directions of the connections (assuming that the connection is bidirectional).

Let us first consider the direction from the cellular network 301 to the second network 305. The uplink data flow from the cellular network comprises TFO frames where data coded with coder $C_1$ is carried. The coder is indicated in the TFO frames, as well as the decoder $D_2$ that is used to decode the downlink data. The decoder $D_2$ may correspond to the coder $C_1$, but it does not have to do so. The coding-decoding unit 302 and a mobile station may use a different coder-decoder pair $C_1$–$D_1$ to modify the uplink data than the one $C_2$–$D_2$ used to modify the downlink data. If the decoder corresponding to coder $C_1$ is noted with $C_1^{-1}$, then the $D_2$ corresponds to $C_1$ may be marked in the following way: $C_1^{-1}=D_2$.

The gateway 303 may thus infer from the TFO frames information about the coder $C_1$ and decoder $D_2$. This is presented in FIG. 3 with arrow 310. It transmits (arrow 320) information about the decoder $D_2$, the decoders D(GW1) that it supports and information that it is TFO capable over the packet network. The TFO capability may be stated implicitly by transmitting the capability information. It may be stated explicitly, for example with a certain TFO indicator in a signaling message, too.

The second gateway 306 can similarly infer information about the coder $C_3$ and decoder $D_4$ that are possibly employed in the second network 305 (arrow 311). The second network is not restricted anyhow, so it may be, for example, a PSTN. If it is a PSTN, no coders or decoders are employed there.

The second gateway receives the information about the capabilities on the other side of the packet network. Thereafter it can decide, how to transmit over the packet network the data it receives from the second network 305. If, for example, the first gateway is not TFO capable, the second gateway may have to compress the whole data flow it receives and thereafter transmit the compressed data. A common compress-decompress method pair is here assumed for all gateways.

If the first gateway is TFO capable, the second TFO gateway has better options. Let us consider first a situation, where the data flow which the TFO capable second gateway 306 receives from the second network 305 comprises TFO frames. In this case, the second gateway can relay the TFO frames, for example, if the endpoint of the connection can decode the data in the frames, i.e. $C_3^{-1}=D_2$. If the cellular network 301 requires that the data flow coming to it comprises the decoded data in addition to the TFO frames, then there are two options. Either the first gateway 304 decodes the data, i.e. $C_3^{-1} \epsilon D(GW1)$, or the second gateway 306 decodes the coded data that the TFO frames carry and codes it again with a coder $C_5$ whose decoder $C_5^{-1}$ the first gateway supports. With respect to avoiding extra coding, this coding and decoding in the second gateway is advantageous only when $C_5^{-1}=D_2$ and $D_2 \epsilon D(GW1)$. In this case, the TFO frames that the second gateway 306 transmits towards the cellular network 301 may be relayed over the air interface to the mobile station. But if the conservation of TFO signaling bits is the main object, then it may be advisable to perform the coding and decoding in the second gateway also when $C_5^{-1} \neq D_2$ and $C_5^{-1} \epsilon D(GW1)$.

In a situation, where the second gateway 306 does not receive from the second network 305 TFO frames, it may decode the data it receives with $D_2^{-1}$, if $D_2^{-1} \epsilon C(GW2)$. If the first gateway has to decode the coded data in TFO frames, then the condition $D_2 \epsilon D(GW1)$ has to be true, too. Otherwise it may be the only option to compress the data.

The second gateway may select the transmission method based on the information it infers from the TFO frames and on the information it receives from the first gateway. There is necessarily no need to negotiate the transmission method with the first gateway if, for example, it has been predetermined that TFO frames that come from the packet network are always relayed further within a decoded data flow.

Let us next consider the direction from the second network 305 to the cellular network 301. The second gateway transmits information about its TFO capabilities, its decoder D(GW2) and about the possible decoder $D_4$ (arrow 321). Based on this information the first gateway 303 may decide, whether to transmit the TFO frames. For example, if the second gateway does not specify a decoder $D_4$, the first gateway may infer that the sufficient condition for transmitting TFO frames is $C_1^{-1} \epsilon D(GW2)$. This guarantees that the second gateway can decode the coded data in the TFO frames, and thereafter transmit it further. The data is thus coded in, for example, a mobile station with coder $C_1$ and decoded only on the other side of the packet network. Otherwise the data may have to be compressed and decompressed on the edges of the network. This reduces the quality of the transmitted data.

If the second gateway specifies a decoder $D_4$, then similar conditions as presented for the first gateway and the decoder $D_2$ may be used in selecting the transmission method.

If the TFO signaling can be carried between the coding-decoding units and if the TFO negotiations succeed, thereafter the employed coders and decoders should fulfill the following conditions: $C_1^{-1}=D_4$ and $C_3^{-1}=D_2$. As stated above, if neither of the cellular networks requires the incoming signal to comprise decoded data, the TFO frames at this point can be simply relayed between the gateways.

The above conditions for choosing TFO frame relay or for compressing the whole received data flow are presented as examples. The scope of the discussion above is to show that already by exchanging only the specified information (TFO, D, D(GW)), it is possible to implement versatile logic for selecting the transmission method.

If one of the gateways does not send information about the TFO and decoding capabilities, the other may infer that it is not TFO capable. In this case the only option to transmit data over the packet network is probably to compress the whole data flow.

Figure 4:
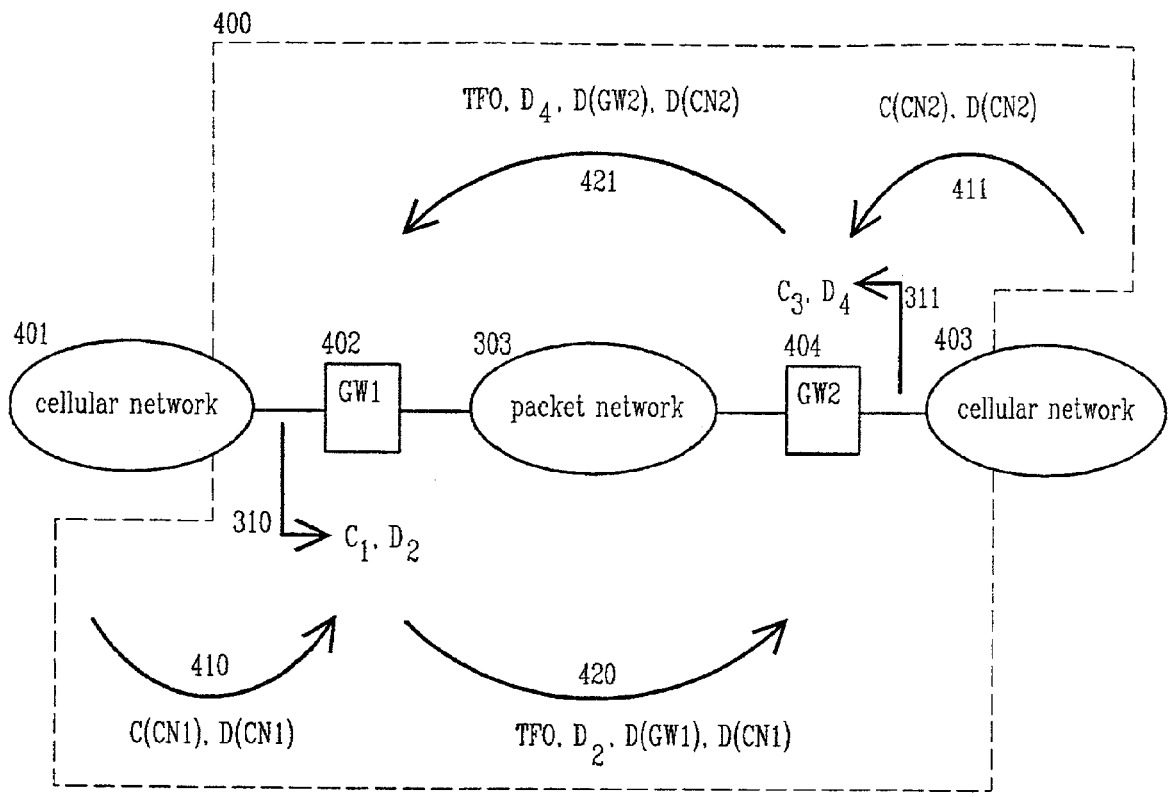
FIG. 4 shows a schematic drawing of a method according to a second preferred embodiment of the invention where information about decoding is transmitted from a cellular network to a gateway.

FIG. 4 presents a method 400 according to a second preferred embodiment of the invention where a cellular network informs a gateway about the coders and decoders it supports. The cellular network 401 is connected to a packet network 303 with, for example, the first gateway 402. The second cellular network 403 is connected to the packet network with, for example, the second gateway 404.

The arrow 410 presents the information about coders C(CN1) and decoders D(CN1) that the cellular network 401 transmits to the first gateway 402. These are the coders and decoders that the cellular network for example in the TFO capable coding-decoding unit that is involved in the connection, supports. For simplicity, let us assume that the cellular networks 401 and 403 accept incoming data that contains only TFO frames if the cellular networks support the decoder that is needed to decode the data in the TFO frames. The coding-decoding units, for example, may decode the data in TFO frames and re-code it using the coder they use in communication with a mobile station. The re-coded data is then transmitted to the mobile station.

The gateways 402 and 404 may infer the coder and decoder that are used in each of the cellular networks similarly as the gateways 304 and 306 presented in FIG. 3. The arrow 310 presents, how the gateway 402 infers the employed coder $C_1$ and decoder $D_2$, and arrow 311 presents similarly, how the gateway 404 infers the employed coder $C_3$ and decoder $D_4$. It is also possible that a coding-decoding unit transmits information about these coder and decoder directly to a gateway. It is clear that the following statements are true: $C_1 \epsilon C(CN1)$, $D_2 \epsilon D(CN1)$, $C_3 \epsilon C(CN2)$ and $D_4 \epsilon D(CN2)$.

The first gateway 402 transmits the following information to the second gateway: TFO capability, the employed decoder $D_2$, and the supported decoders D(CN1) and D(GW1). This is presented in FIG. 4 with the arrow 420. In the system presented in FIG. 4 it is possible to relay TFO frames which carry data coded with $C_3$ over the packet network from the cellular network 403 to the cellular network 401, if $C_3^{-1}=D_2$. In this case, the data is coded and decoded only once over the connection (see arrow 430, where solid circles refer to coding and open circles refer to decoding). The TFO frames can be relayed from the second gateway 404 also if $C_3^{-1} \epsilon D(CN1)$. In this case, the first cellular network may decode the data in the TFO frames and re-code it using $D_2^{-1}$(arrow 431). The decoding and re-coding may be, optionally, carried out in the second gateway, if $C_3^{1} \epsilon D(GW2)$ and $D_2^{-1} \epsilon C(GW2)$, see arrow 432. If information C(GW1) about the coders supported in the first gateway 402 is also transmitted to the second gateway, then it may relay the TFO frames also when $C_3^{-1} \epsilon D(GW1)$ and $D_2^{1} \epsilon C(GW1)$. In this case the first gateway decodes the data in the TFO frames and re-codes it using $D_2^{1}$(arrow 433).

Similarly, the second gateway 404 transmits information about the TFO capability, the employed decoder $D_4$, and the supported decoders D(CN2) and D(GW2) over the packet network (arrow 421). As to the other direction, it is possible to relay the TFO frames, for example, if $C_1^{-1} \epsilon D(GW2)$. If the second network 403 is not a cellular network but, for example, a fixed network, then the sets C(CN2) and D(CN2) are empty.

Again, the above conditions for choosing TFO frame relay or for compressing the whole received data flow are presented as examples. Here it was noticed that in some cases the information about the coders that are supported in the gateways may be worth to transmit over the packet network.

Figure 5:
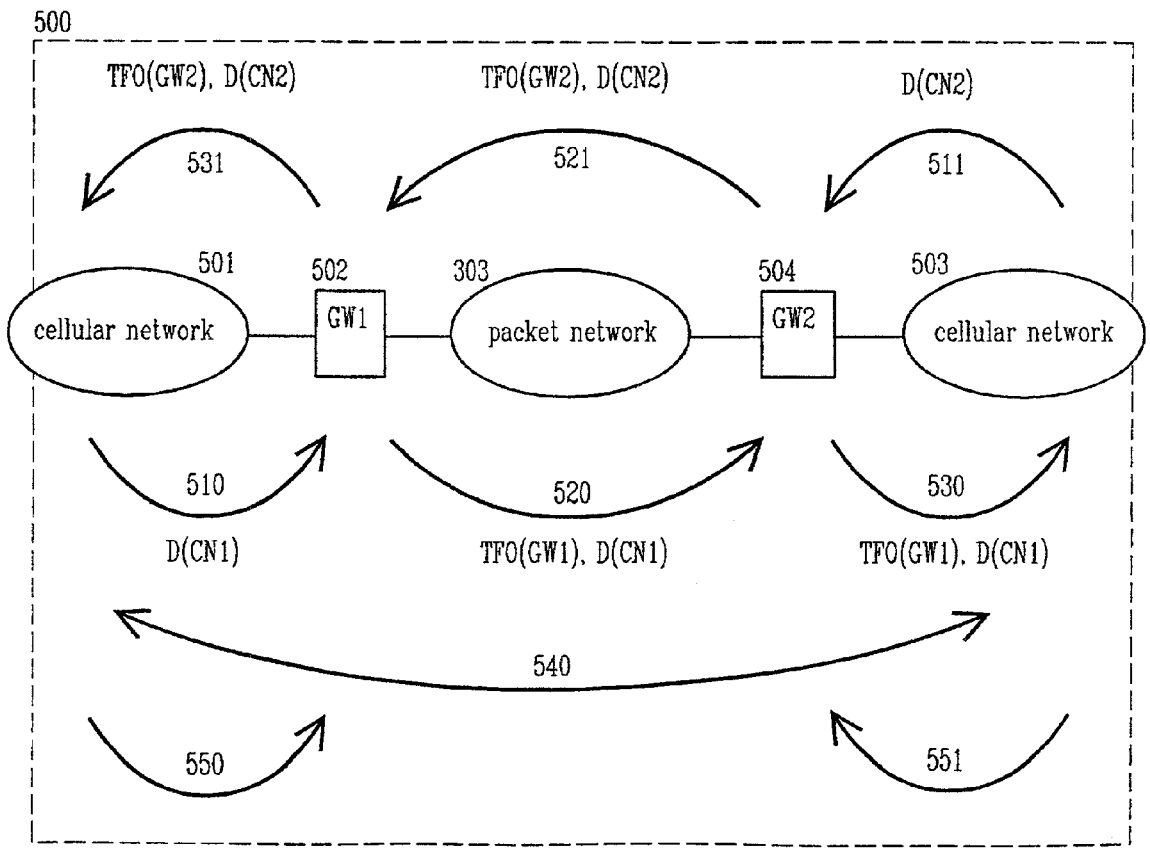
FIG. 5 shows a schematic drawing of a method according to a third preferred embodiment of the invention where coding and decoding is negotiated when a call is established and FIG. 6 shows an arrangement and network elements for transmitting TFO information according to a fifth preferred embodiment of the invention.

FIG. 5 presents a method 500 according to a third preferred embodiment of the invention where the employed coders and decoders are negotiated between the cellular networks. The negotiation can be carried out directly between the cellular networks or via gateways. The negotiation is carried out already when establishing the connections, so the gateways do not have to infer the coders and decoders from the TFO frame flows. The gateways may perform some decoding and re-coding as in the method according to the second preferred embodiment of the invention.

The cellular network 501 transmits to the gateway 502 that connects it to the packet network 302 information at least about the supported decoders D(CN1). This is presented with the arrow 510 in FIG. 5. Similarly, the cellular network 503 transmits to the gateway 504 that connects it to the packet network 302 information about the decoders D(CN2) (arrow 511).

The gateways exchange information about the TFO capabilities of the gateways and the decoding capabilities of the cellular networks (arrows 520, 521). This information is transmitted further to the cellular networks (arrows 530, 531). Now each cellular network knows the decoding capabilities of the other, and they can negotiate (arrow 540) the coding and decoding methods that are used in this connection. If there are (at least one) coders that are supported in this network and the corresponding decoders are supported in the other network, it is advisable to choose the coder used in this network among those coders. If such a common coder-decoder pair can be chosen, the gateways may be told just to relay the frames (arrows 550, 551). In this case, the gateways do not have to monitor the TFO frame flow to figure out how to transmit it over the packet network or to figure out if they have to decode and re-code the data in the TFO frames. If the gateways support decoding and recoding, then the decoding information that is transmitted over the packet network and that is presented with arrows 520, 530 and arrows 521, 531 may comprise also D(GW1) and D(GW2), respectively.

If a common coder-decoder pair cannot be chosen, the decoding and re-coding can possibly be made in the cellular networks. Also in this case the gateways can be told just to relay the TFO frames.

This method according to the third preferred embodiment of the invention can be applied, for example, in the Universal Mobile Telecommunication Networks (UMTS) which are connected to each other with a packet data network. In UMTS, the Call Control can restrict the coding-decoding methods a UMTS-TRAU and a mobile station employ between themselves. The Call Control can receive the information about the decoders that are supported in the other cellular network from the gateway. It can also tell the gateway just to relay the TFO frames.

If both the cellular networks involved in a connection are UMTS networks, then there may be a separate protocol which the Call Control units use in the coder negotiation when establishing the connection. The data may be transmitted via the gateways as presented in FIG. 5.

In a method according to a fourth preferred embodiment of the invention, new protocol messages or additions to existing protocol messages are defined for enabling the exchange of TFO capabilities and decoding capabilities. There are specific protocols for transmitting data for real time application over packet net-works, for example the Real-time Transmission protocol (RTP) is used especially in IP networks.

Between gateways, the calls that are transferred over RTP may be multiplexed and transmitted over a single RTP connection. The RTP Control Protocol (RTCP) is used to transmit certain control commands between the endpoints of the RTP connection. The RTCP is used, for example, when a call is established, to pass information about the endpoints of a call. During a call, the RTCP provides feedback on the quality of the data distribution.

Consider a gateway that connects a cellular network to an IP network and uses RTP to transmit calls over the IP network. This gateway may, for example, monitor the data flow from the cellular network. After noticing TFO frames in the data flow, it may use a certain RTCP message to inform the other gateway about, for example, the following issues: the TFO capability of the gateway, the decoder used in the cellular network and the decoders that the gateway supports.

There are five types of RTCP packets, and the APP (application) type that is defined for application specific functions may be the most suitable for the transmitting TFO and decoding capabilities. Each RTCP packet begins with a certain header, followed by structured elements that may be of variable length according to the packet type. The structured elements contains consecutive payload identifiers and payloads carrying the specified information. New payload types, for example gateway TFO capabilities, current decoder and gateway decoder capabilities may be defined. The gateways decoder capabilities payload, for example, may be a list of the decoders the gateway supports and in the beginning of the payload the number of decoders in the list may be defined.

It is also possible to transmit information about the TFO capabilities and decoding capabilities, for example, in a RTP packet by defining a new payload type for RTP packets. The payload of the RTP packet can comprise similar information as above mentioned payload of the RTCP APP packet.

In H.323 networks it is possible to transmit the TFO and decoding capabilities using H.245 signaling. The advantage of H.245 signaling compared to the RTP or RTCP messages is that all H.323 gateways support H.245 signaling. The H.245 signaling specification defines the exchange of capability information between H.323 endpoints. By modifying this signaling so that each endpoint, for example, sends its TFO capability information and lists the decoders it supports to the other endpoint the gateways may exchange information about these issues. The TFO information exchange messages may be, for example, similar to the terminalCapabilitySet message.

To a man skilled in the art it should be clear how to modify the RTP or RTCP packets or H.245 messages so that information about TFO capabilities and decoding capabilities can be exchanged. Above some possible modifications to the packets and messages have been discussed briefly.

It is possible that a gateway 304, 306, 402, 404, 502 or 504 comprises a Media Gateway (MG) and a Media Gateway Controller (MGC). In his case, information about the TFO capabilities, about the current decoder and/or decoding capabilities is typically transmitted using the following route: MG1 - MGC1 - MGC2- MG2 (typically in both directions). The information transmitted between two MGCs, between a MGC and a MG, or between a gateway GW and a MGC can be, for example, such information as is presented with arrows 320, 420, 520 or with arrows 321, 421,521. Between two Media Gateway Controllers or between a gateway GW and a Media Gateway Controller the information can be exchanged, for example, using modified RTP or RTCP packets or using H.245 messages. Between Media Gateway and a Media Gateway Controller the information can be exchanged, for example, using a protocol designed specifically for this purpose or using an enhanced version of protocol H. 248. If a cellular network informs a gateway about its coding/decoding capabilities (arrows 410, 411, 510, 511), this information can be transmitted from the cellular network to a Media Gateway, which transmits the information further to a Media Gateway Controller, or directly to a Media Gateway Controller.

Figure 6:
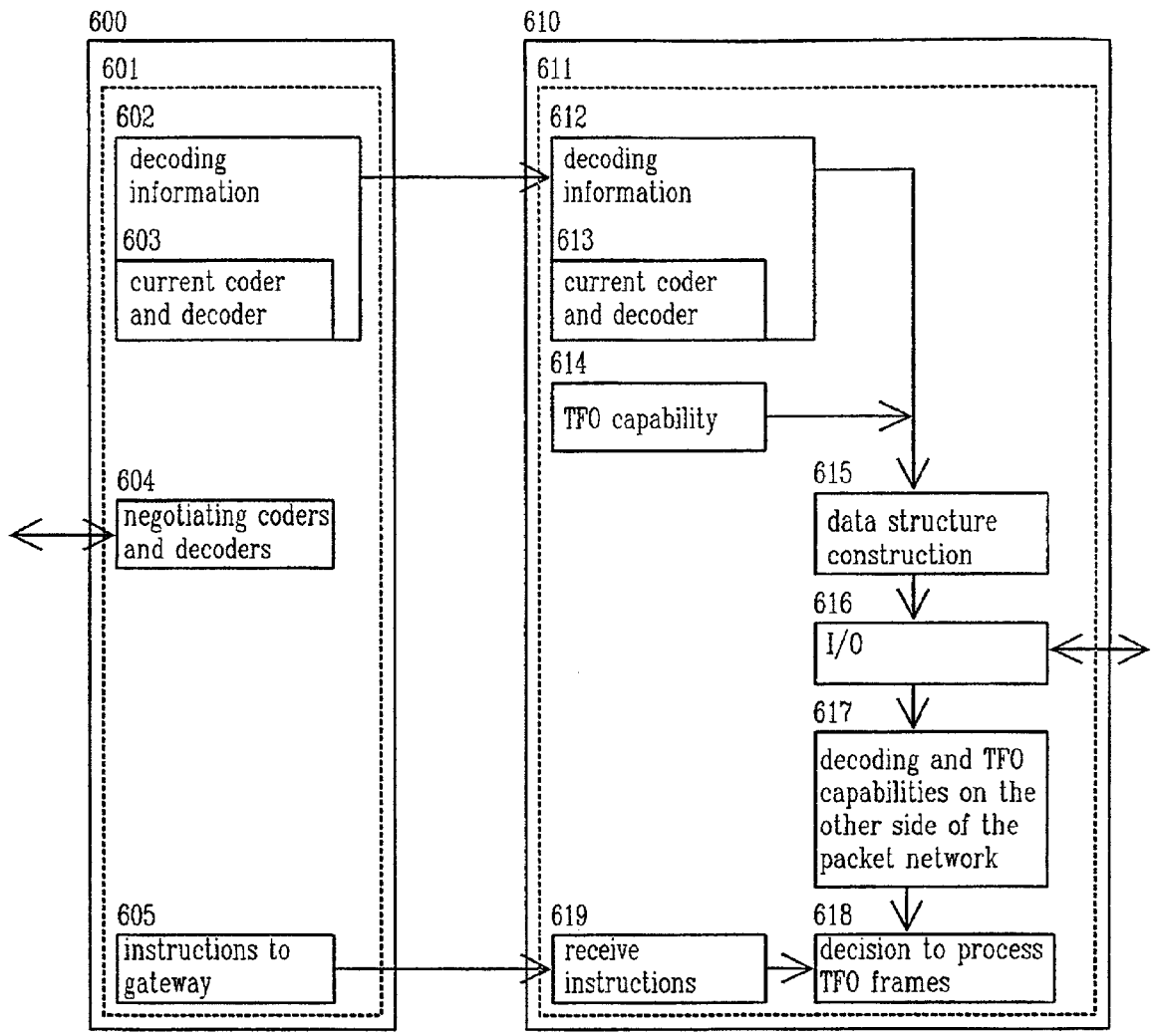

FIG. 6 presents arrangements according to a fifth preferred embodiment of the invention. The decoding information exchange arrangement 611 comprises a block 612 where decoding information about the decoding capabilities on this side of the packet network is established. On this side of the packet network refers here to the gateway and/or to the cellular network. Information about the decoders supported by the cellular network may be included, for example, to a configuration file, or the information may be received online from the cellular network (decoding information block 602 in decoding information transmission arrangement 601).

The decoding information block 612 may comprise a block 613 that is responsible for inferring the coder and/or decoder in the current connection. The information can be inferred from the TFO frames or there may be in the cellular network a TFO extension arrangement 601, which contain a block 603 that indicates the coder and decoder that are in use in a certain connection.

The decoding information exchange arrangement has information about the TFO capability on the edge of the packet network, for example in a gateway (block 614). Information from blocks 612–614 is gathered and a data structure that comprises at least part of the coding information and the TFO capability information is constructed in data structure block 615. The data structure is sent over the packet network using the input-output block 616. The same I/O block is used to receive data from a similar gateway arrangement, and from the received data the decoding and TFO capabilities on the other side of the packet network are inferred (block 617). If not data is received, it is possible to conclude that the other gateway does not support any coders or decoders, and that it is not TFO capable.

Based on the received information a decision how to process the incoming TFO frames is made in the decision block 618. It is possible that the cellular network gives instructions (block 605), which the decoding information exchange arrangement receives (block 619) and which affect the decision to process the TFO frames.

The decoding information transmission arrangement 601 in the cellular network may comprise also a negotiation block (604) which can receive and send information about the available coders and decoders and negotiate the coder and decoder that will be employed in a certain connection. This negotiation can be made already during the call establishment.

The decoding information exchange arrangement 611 is preferably implemented in the gateway 610 that connects a network to the packet network. If the network that the gateway connects to the packet network is a not a cellular network, the block 613 does not have to be implemented. If the gateway comprises a Media Gateway and a Media Gateway Controller, then the decoding information exchange arrangement 611 is typically part of the Media Gateway Controller. The Media Gateway is responsible, for example, for performing actual decoding-coding (as illustrated in FIG. 4), if there is need for such functionality in a certain connection.

The decoding information transmission arrangement 601 may be implemented in a certain cellular network element 600. It may be implemented, for example, in the coding-decoding unit.

Consider a situation where a terminal equipment that supports the coders and decoders that are used in cellular networks is connected directly to the packet network. Further, the terminal equipment can send and received coded data in TFO frames. If the terminal equipment comprises the decoding information exchange block 611, then the terminal may send information about its decoding capabilities and receive information about the decoding capabilities of a cellular network on the other side of the packet network.

If a coding method corresponding to the decoding method used in, for example, a mobile station in the cellular network is implemented in the terminal equipment, the terminal may choose that coding method for coding data. The coded data may then be transmitted in TFO frames to the cellular network. In the opposite direction the coding method in the cellular network may be chosen so that the terminal equipment supports the corresponding decoder. Another option is that the cellular network or the gateway connecting the cellular network to the packet network performs decoding and re-coding.

The terminal equipment may be, for example, an H.323 terminal that comprises the decoding information exchange block 611. The packet network may be, for example, an IP network over which H.323 telephony is carried out.

The invention does not restrict the choice of the data transmission method over the packet network. By changing information about the decoding and tandem free operation capabilities on each side of the packet network according to the invention, the gateways, the networks connected to the packet network or the endpoints of a connection can select a suitable way to process the data that is to be transmitted.

Thus, while there have been shown and described and pointed out fundamental novel features of the present invention as applied to a preferred embodiment thereof, it will be understood that various omissions and substitutions and changes in the form and details of the devices described and illustrated, and in their operation, and of the methods described may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is the intention, therefore, to be limited only as indicated by the scope of the claims appended hereto.

What is claimed is:

1. A method for transmitting information related to tandem free operation, comprising:

connecting a cellular network comprising a tandem free operation capable coding-decoding unit to a packet network via a first gateway, connecting an entity to the packet network via a second gateway;

transmitting data over the packet network between said coding-decoding unit on a first side of the packet network and said entity on a second side of the packet network;

transmitting information about the decoding capabilities and tandem free operation capabilities on the first side of the packet network from the first gateway to the second gateway over the packet network to the second side of the packet network for enabling on said second side of the packet network transmission of data frames to the packet network, when such data frames are either received from said entity or producible using at least information received from said entity, said data frames carrying coded data and signaling information relating to tandem free operation, and the coding of the coded data in the data frames corresponding to the decoding capabilities on the first side;

wherein said first gateway comprises a media gateway and a media gateway controller, and said information is transmitted from the media gateway controller to the second gateway.

2. The method of claim 1, wherein information about the decoding capabilities and tandem free operation capabilities on the second side of the packet network is transmitted to the first side of the packet network.

3. The method of claim 1, wherein the tandem free operation capabilities and decoding capabilities on the first side of the packet network and a current decoding method that is used in the cellular network on said side of the packet network are transmitted to the second side of the packet network.

4. The method of claim 3, wherein information about the current decoding method is inferred from the tandem free operation frames that are comprised in a data flow that comes towards the packet network.

5. The method of claim 4, wherein information about the current coding method that is used in a cellular network on the first side of the packet network is inferred from the tandem free operation frames that are comprised in the data flow that comes towards the packet network.

6. The method of claim 3, wherein information about the decoding capabilities of the cellular network on the first side of the packet network is transmitted to the second side of the packet network.

7. The method of claim 6, wherein information about the decoding capabilities of the cellular network on the first side of the packet network is established by transmitting said information from said cellular network.

8. The method of claim 6, wherein said entity is a cellular network, and the coding and decoding capabilities of each cellular network is transmitted to the other cellular network and the coding and decoding methods used in a certain connection are negotiated between the cellular networks when the connection is established.

9. The method of claim 8, wherein instructions on how to transmit the data flow coming from each cellular network are transmitted from the cellular networks towards the packet network.

10. The method of claim 1, wherein calls are transmitted over the packet network using a certain protocol defined for real time applications and information about the decoding capabilities and tandem free operation capabilities on the first side of the packet network are transmitted to the second side of the packet network using a certain control protocol for real time applications.

11. The method of claim 10, wherein information about the decoding capabilities and tandem free operation capabilities is transmitted in Real-Time Transport Control Protocol (RTCP) messages.

12. The method of claim 10, wherein information about the decoding capabilities and tandem free operation capabilities is transmitted in Real-Time Transport Protocol (RTP) messages.

13. The method of claim 10, wherein information about the decoding capabilities and tandem free operation capabilities is transmitted in H.245 signaling messages.

14. The method of claim 1, wherein the entity comprises a second network or a terminal.

15. A decoding information exchange arrangement for exchanging information over a packet network, comprising:

means for establishing tandem free operation information about the tandem free operation capability on its side of the packet network and means for communicating data structures over the packet network;

means for establishing decoding information about decoders on its side of the packet network, said means for establishing decoding information comprises means for establishing information about a decoder used in a certain connection over the packet network;

means for establishing a data structure that comprises said tandem free operation information and at least a certain part of said decoding information; and means for receiving information about tandem free operation capability and decoding information on another side of the network for enabling to the packet network transmission of data frames, when such data frames are either received from its side of the packet network or producible using at least information received from its side of the packet network, said data frames carrying coded data and signaling information relating to tandem free operation, and the coding of the coded data in the data frames corresponding to the decoding capabilities on the other side.

16. The arrangement of claim 15, further comprising:

means for receiving instructions about the processing of tandem free operation frames.

17. A gateway for connecting a first network to a certain side of a second network, which second network is a packet network, comprising:

means for establishing tandem free operation information about the tandem free operation capability on said side of the second network;

means for communicating data structures over the second network;

means for establishing decoding information about decoders on said side of the second network;

means for establishing a data structure that comprises said tandem free operation information and at least a certain part of said decoding information; and means for receiving information about tandem free operation capability and decoding information on another side of the second network for enabling to the packet network transmission of data frames, when such data frames are either received from its side of the packet network or producible using at least information received from its side of the packet network, said data frames carrying coded data and signaling information relating to tandem free operation, and the coding of the coded data in the data frames corresponding to decoding capabilities on said another side.

* * * * *